UNITED STATES PATENT OFFICE.

LUCAS PETRON KYRIAKIDES, OF BOSTON, MASSACHUSETTS, ASSIGNOR TO HOOD RUBBER COMPANY, A CORPORATION OF MASSACHUSETTS.

PROCESS FOR PRODUCING ISOPRENE.

1,094,223.     Specification of Letters Patent.    Patented Apr. 21, 1914.

No Drawing.     Application filed January 17, 1912. Serial No. 671,715.

*To all whom it may concern:*

Be it known that I, LUCAS P. KYRIAKIDES, citizen of the United States, residing at Boston, Massachusetts, have invented certain new and useful Improvements in Processes for Producing Isoprene, of which the following is a specification.

The new process consists in passing the vapors of 1.3-dihydroxy-2-methylbutane, $CH_2(OH).CH(CH_3).CH(OH).CH_3$, over dehydrating catalytics such as aluminum silicate (kaolin) at temperatures ranging from 300°–500° C., and varying pressures.

The reaction proceeds according to the following equation:

$$CH_2(OH).CH(CH_3).CH(OH).CH_3 = CH_2:C(CH_3).CH:CH_2 + 2H_2O.$$

In order to illustrate the process more fully, the following example is given: The methylbutandiol, of the above formula, is distilled slowly over aluminum silicate kept at about 400° C., the pressure being, preferably, reduced by means of a vacuum pump. The reaction products are condensed by means of refrigerating agents. The isoprene after fractional distillation is pure enough to be used as such. The yield of isoprene is over 70% of the theory.

I claim:

1. The process of producing isoprene which consists in bringing the vapors of a methylbutandiol into contact with a heated dehydrating catalytic.

2. The process of producing isoprene which consists in passing the vapors of a methylbutandiol over a heated dehydrating catalytic.

3. The process of producing isoprene which consists in passing the vapors of a methylbutandiol over a heated dehydrating catalytic at a reduced pressure.

4. The process of producing isoprene which consists in passing the vapors of 1.3 dihydroxy-2-methylbutane, over a heated dehydrating catalytic at a reduced pressure.

5. The process of producing isoprene, which consists in passing the vapors of 1.3-dihydroxy-2-methylbutane, over a heated dehydrating catalytic.

6. The process of producing isoprene, which consists in passing the vapors of 1.3-dihydroxy-2-methylbutane, over a heated dehydrating catalytic, and thereafter condensing the products.

7. The process of producing isoprene, which consists in passing the vapors of 1.3-dihydroxy-2-methylbutane, over heated dehydrating catalytics at a temperature not less than 300° C.

8. The process of producing isoprene, which consists in passing the vapors of 1.3-dihydroxy-2-methylbutane over heated aluminum silicate at a temperature not less than 300° C.

In testimony whereof, I affix my signature in presence of two witnesses.

LUCAS PETRON KYRIAKIDES.

Witnesses:
J. R. MOTT,
M. A. HAGARTY.